Figure 1:
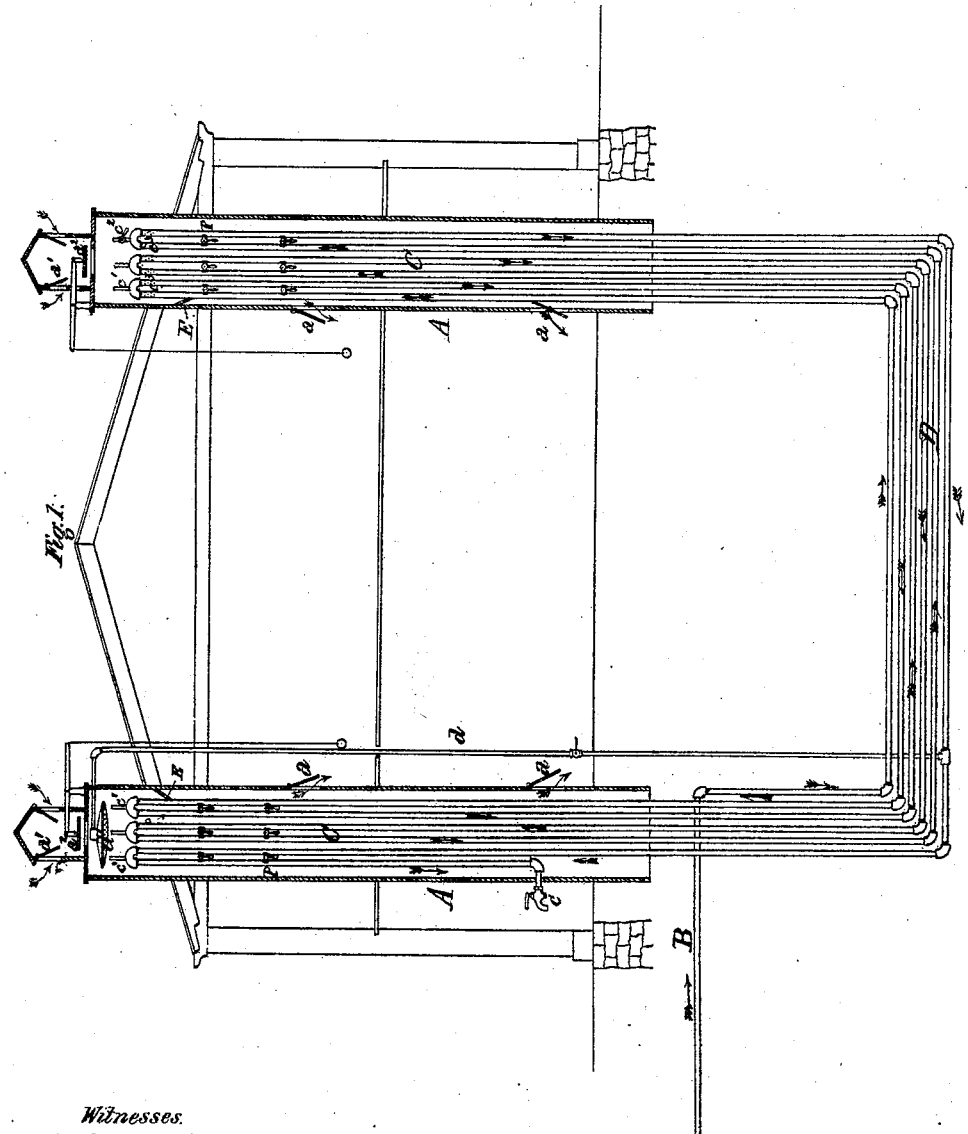

D. E. Somes,
House Ventilator.
No. 96,047.   Patented Oct. 19, 1869.

2 Sheets. Sheet 1.

Witnesses.
J. Snowden Bell.
F. C. Somes.

Inventor.
D. E. Somes

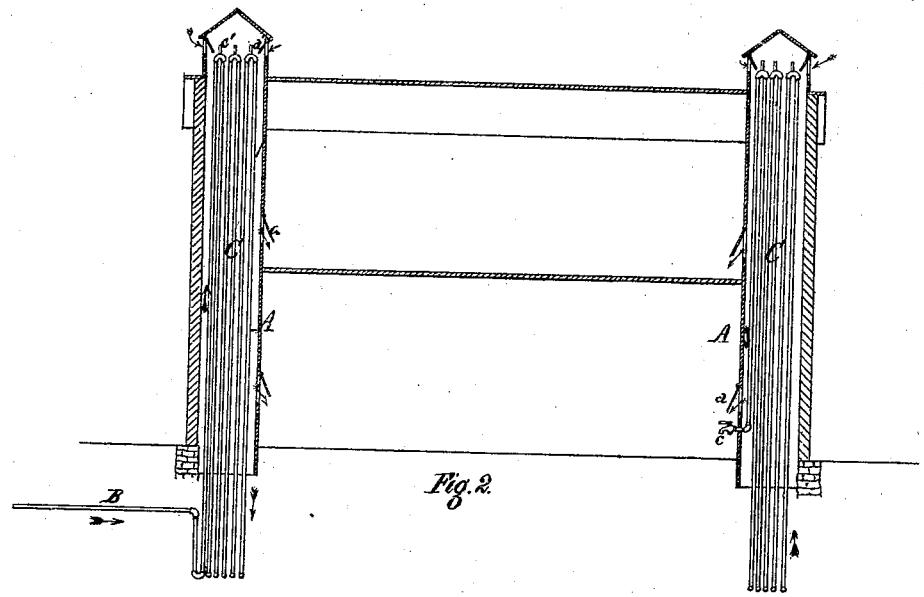
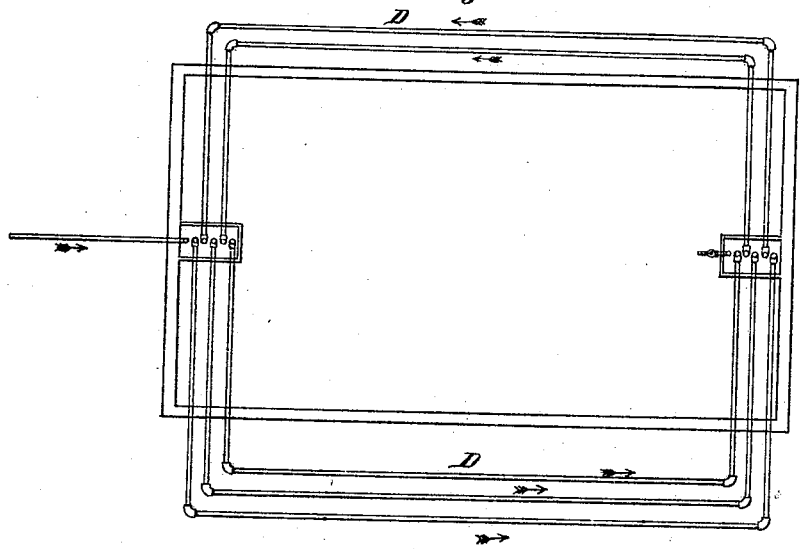

United States Patent Office.

DANIEL E. SOMES, OF WASHINGTON, DISTRICT OF COLUMBIA.

Letters Patent No. 96,047, dated October 19, 1869.

IMPROVED MODE OF VENTILATING AND COOLING.

The Schedule referred to in these Letters Patent and making part of the same.

*To all whom it may concern:*

Be it known that I, DANIEL E. SOMES, of Washington, in the District of Columbia, have invented a new and useful Improvement in Cooling Air; and I do hereby declare that the following is a full, clear, and exact description thereof, reference being had to the accompanying drawings, which make part of this specification, and in which—

Figure 1 represents a transverse section of a building to which my improvements are applied;

Figure 2, a longitudinal section of a building, showing a different arrangement of pipes; and Figure 3, a ground plan of same.

My invention is designed to provide a means of supplying churches, halls, public buildings, or other edifices with fresh and cool air, as well as to cool the water of the hydrants thereof; to which ends, My improvements consist in providing air-ducts or passages connected with or built in the walls of the building, or placed in any convenient positions therein, the said air-ducts entering into the ground a short distance, and extending above the roof of the building.

A series of pipes is arranged within each air-duct, communicating with another series of pipes buried in the earth beneath the building.

Fresh air is supplied to the building through the air-ducts, which are provided with suitable doors and dampers, and is cooled by contact with the pipes through which the hydrant-water is caused to pass, or that may be pumped from a well or other body of water, the said water being cooled in its passage through the pipes buried in the earth, or a body of water, or any cooling-substance, as hereinafter to be described.

In the accompanying drawings, which show a convenient arrangement of parts for carrying out the objects of my invention—

A A represent two air-ducts, which are placed vertically in a building near the sides thereof, extending a short distance into the ground beneath, and emerging above the roof, or extending to some points within the building.

The fresh air which is supplied to the building is admitted to the air-ducts by the doors $a^1$, near their tops, or at any convenient point from within or without the building, and, passing downward, is supplied to the different apartments by doors, *a a*, or a register, or its equivalent.

The air-ducts are provided with dampers, $a^2$, by which the supply of air can be shut off when desired.

If found desirable to cool the air over and over again, it may be admitted to the air-duct from near the top of the room, through the register or its equivalent, and, descending, pass into the same apartment near the floor.

When there are apartments to be cooled one above another, the air may enter the duct from a higher, and descend and enter a lower apartment, from which it will pass up through communicating-registers or other openings in the floors and ceilings or walls.

A series of thin metallic pipes, C, is arranged within each duct, connected at top by proper elbows, the two series being united by means of another series of pipes, D, buried in the ground beneath the building.

Water is supplied to the pipes of one air-duct by the supply-pipe B, and circulating through C and D, as shown by the red arrows, is finally drawn off at the cock *c* of the other air-duct.

The water is cooled in its passage through the pipes D, and the air, passing through the ducts A, is cooled by contact with the thin metallic pipes C.

To assist in cooling the air and water, and to increase the downward current of air, a shower-bath, $d'$, may be placed at the top of the air-duct, or at any convenient point, being supplied by the pipe *d*, furnished with a stop-cock, communicating with one of the pipes D, and placed either within the air-duct or in convenient proximity thereto; or small holes, $c^3$, may be made in the pipes C, near their upper ends, from which water will flow over the outside of the pipes.

Inclined boards, E, may be inserted in the air-duct, to prevent the water from the shower-bath or holes from escaping into the rooms.

To afford outlets for the air from the pipes C and D, which would otherwise operate to impede or prevent circulation, air-pipes, $c^1$, are provided, which are screwed into the elbows, which unite the pipes C, at their upper ends, and in a vertical position.

These pipes may be furnished with stop-cocks, $c^2$, if desired, when the water is liable to rise above their tops.

The pipes C may be provided with connections, furnished with stop-cocks, *p*, and placed below their tops, so that, in case there should not be sufficient head to force the water as high as their tops, it may pass through the connections, which can be placed at any height desired in the pipes C.

In figs. 2 and 3, the air-ducts are shown as placed at the ends of the building, and the pipes D, buried in the ground, at the sides and ends thereof, thereby causing the water to circulate through a much greater extent of pipe than in the preceding case, for the purpose of being more thoroughly cooled.

The air-ducts A may be composed of wood or metal, and either built into the walls or separated therefrom, as found most convenient; and the whole apparatus can be applied to buildings already constructed, at inconsiderable expense.

Having thus fully described my invention,

What I claim therein as new, and desire to secure by Letters Patent, is—

1. Cooling the air which is supplied to a building, by passing it through ducts or channels containing a series of pipes, through which cool water is circulated, substantially as described, in combination with the shower-bath $d'$.

2. The air-pipes $c^1$, at the tops of the series C, provided with stop-cocks or open tubes, in combination with an air-duct, as and for the purpose set forth.

3. The combination of the supply-pipes B, series of pipes C C D, and cock $c$, with the air-ducts A A, substantially as described.

4. The dampers $a^2$, air-ducts, pipes, registers, valves $a^1$, or their equivalents, substantially as and for the purpose set forth.

5. Inclined boards E, air-ducts, shower-bath, and water-pipes, in combination with the registers $a$, substantially as and for the purpose described.

D. E. SOMES.

Witnesses:
CHARLES HERRON,
F. C. SOMES.